March 28, 1950
R. M. THAYER
2,502,184
METHOD OF DISPENSING AND MEASURING THE
QUANTITY OF LIQUEFIED GASES
Filed May 20, 1943
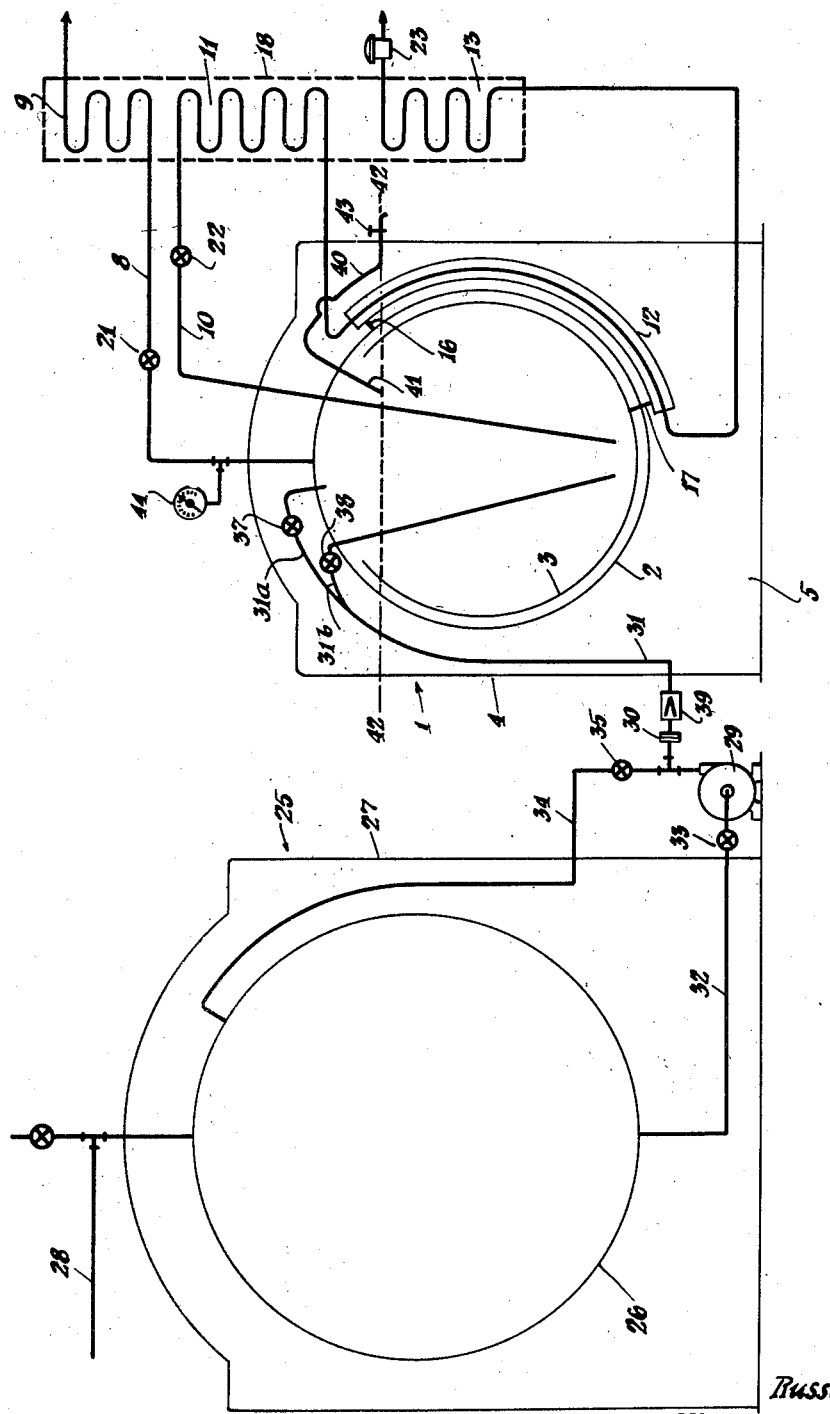
INVENTOR.
Russell M. Thayer
BY
Watson, Bristol, Johnson & Leavenworth
ATTORNEYS Patented Mar. 28, 1950

2,502,184

UNITED STATES PATENT OFFICE 2,502,184

METHOD OF DISPENSING AND MEASURING THE QUANTITY OF LIQUEFIED GASES

Russell M. Thayer, Kenmore, N. Y., assignor to The Linde Air Products Company, New York, N. Y., a corporation of Ohio Application May 20, 1943, Serial No. 487,792

3 Claims. (Cl. 62—1)

The present invention relates to a method of dispensing and measuring the quantities so dispensed of a liquefied gas having a boiling point temperature at atmospheric pressure below 273° K. It embodies features of charging a pressure container for liquefied gas in a manner to enable a ready determination of the amount of the charge. The method is of particular advantage in the charging of containers with liquid oxygen, which is intended to be maintained under considerable pressure and withdrawn therefrom and vaporized and heated as required for industrial use. Liquid oxygen is highly volatile, it having a boiling point at atmospheric pressure considerably below 233° K., and the condition of such a material within a confined space may vary over considerable ranges of pressure and temperature including the degree of subcooling if any of the liquid and the condition of the gas over the liquid as to saturation or superheat.

A typical container of the character here contemplated is one employed by a purchaser and consumer of liquid oxygen. Such a container commonly serves as the immediate supply for industrial purposes, and is accordingly maintained under a pressure of, for example, 150 to 175 lbs. per square inch gauge, dependent upon the commercial uses for the gases derived therefrom.

Some means must be arranged, of course, for determining the amount of oxygen delivered by the distributor to the consumer, and a common method has been to vent the container to the atmosphere and to fill it to a certain level at atmospheric pressure. The volumetric contents to such level being known, a ready means of measurement is provided. The venting or blowdown to the atmosphere, however, results in considerable loss of gas material, both on the initial release and during the filling operation. It is an object of this invention to avoid these losses while providing a reliable means of measuring the charge and without creating excessive pressure in the container. When the liquid contents of such a vessel are consumed it will be apparent that there will remain a considerable, but uncertain, amount of the material in the gaseous form dependent upon the temperature, degree of superheat of the residual vapor, and the pressure to which the container has been exhausted. If the container is now recharged without venting, a different set of pressure and temperature conditions will normally result. Of particular concern is the fact that if the charging liquid line leads to the bottom of the container discharging into the normal liquid phase of the container contents, the gas pressure during filling, due to the reduction in volumetric extent thereof, will rise considerably to the point of possible danger or requiring a vent to the atmosphere through a safety release with again loss of material.

The present invention is directed to the provision of a simple, economical system and method which will meet satisfactorily the conditions noted in part above.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of which invention will be indicated in the claims.

For a fuller understanding of the nature and objects of the invention reference should be had to the following detailed description taken in connection with the accompanying drawing.

The single figure of the drawing shows in diagrammatic form a typical system adapted to carry out the method. The pressure container or receiver is indicated generally at 1. Only one such container is shown in the drawing, but in practice the system will normally include another similar container for alternate use as will appear hereinafter. The container 1 is of a character adapted to supply gas under pressure for industrial use and, as depicted, is of the type commonly known as a "cold converter." It comprises a main pressure resisting vessel 2 which may, if preferred, be provided with an inner liquid basket 3. The vessel 2 is surrounded by an outer shell 4 spaced therefrom sufficiently to provide a heat insulating chamber 5 which may be filled with suitable powder, such as magnesium carbonate.

A gas withdrawal line 8 is provided which includes a heating coil 9. The container is also provided with a line 10 extending from the bottom of the inner basket for withdrawing liquid and vaporizing the liquid and heating the generated gas. The liquid line embodies a vaporizing coil 11 from which the line passes to a heat exchanger 12 and from there to the gas heater coil 13. The heat exchanger is of the general character disclosed in the patent to Dana No. 1,950,353 issued March 6, 1934, its function being to increase the pressure in the main vessel 2 and accelerate the withdrawal of liquid. To this end the tubular member 12 is provided with a connection 16 to the interior of the upper portion of the vessel 2, and at its lower end with a connection 17 to the interior of the basket 3 whereby a column of liquid is maintained in the tubular member 12. The liquid pipeline 10 passes through the liquid column longitudinally thereof, and since the temperature in line 10 has been elevated in heater coil 11 heat is transferred to the liquid in column 12, which serves to vaporize corresponding amounts thereof and to maintain the pressure within the vessel 2 and the flow of liquid through the pipeline 10 as required for use.

For convenience, the several heater coils 9, 11 and 13 may be included within a single heating chamber indicated diagrammatically at 18. The gas and liquid withdrawal lines 8 and 10 each have a suitable shut-off valve 21 and 22 respectively. Each or both lines may be provided also with a pressure regulating valve, such as that shown at 23 in the liquid line 10.

The container 1 is adapted to be intermittently recharged with liquid from some appropriate source which may be, for example, a large main storage container maintained on the consumer's premises, or a transport tank container. Such a container is shown generally at 25, comprising an inner vessel 26 having an outer shell 27 with an intervening insulating space which, similarly to that of the receiver 1, may be filled with a heat insulating powder, such as magnesium carbonate. A supply line is shown at 28. Under the most common conditions it will be more practicable to maintain the liquid in the container 26 at atmospheric pressure, or at least at a relatively low pressure, and the supply container 26 may accordingly be of relatively light weight and economical construction.

Suitable means for forcing the liquid into the receiver 1 are provided, such as a mechanical pump which may be of the rotary type and for higher pressure have a plurality of stages. Such a means is indicated generally at 29. In case the supply container 25 is a transport tank, the pump may be mounted either at the consumer's establishment or on the transport, dependent upon the circumstances. Suitable coupling means appropriate to the general arrangement may be provided, such as that shown at 30 in the pump discharge line 31. A pump intake line 32 provided with a shut-off valve 33 leads from the bottom of the supply container 26. The pump has a priming line 34 which embodies a shut-off valve 35, the line 34 leading back to the upper portion of the supply container 26.

Returning now to the receiver 1, the pump is adapted to discharge through line 31 and the branch 31a thereof into the top of the receiver vessel 2 into and through the gas phase thereof. For special purposes a branch 31b may be provided adapted to lead the pump discharge to the bottom of the inner basket of vessel 2 whereby the liquid is discharged into the liquid phase of the receiver. Suitable shut-off valves 37 and 38 are provided in the lines 31a and 31b respectively. The pump discharge line 31 is provided preferably with a check valve 39.

The receiver or container 1 is equipped with means for indicating the liquid level which may vary in construction, but as here shown comprises a simple arrangement of a tube 40 having its inner open end 41 located at the level within the basket 3 corresponding to the level of liquid for a standard filling, indicated by the line 42—42. The tube 40 extends to the exterior of the shell 4 and is provided with an outlet controlled by trycock 43. As diagrammatically shown, the intermediate portion of tube 40 arcs upwardly but in some cases it will be desirable that the tube lie in substantially the plane of liquid level 42 throughout the tube's extent, as for example when used to indicate the liquid level with the container at atmospheric pressure. The complete system will include a suitable pressure gauge 44.

As heretofore mentioned, the customer will normally have two containers similar to that indicated generally at 1 and, assuming that one of these has been exhausted of liquid oxygen material, withdrawal will be shifted over to the other and the empty container recharged. In accordance with the principles of the present invention, the preferred method of recharging the empty container 1 and determining the amount of the charge is as follows: Although exhausted of its liquid contents, the container will remain filled with gaseous oxygen under considerable pressure. The container is isolated by closing valves 21 and 22, and a reading of this pressure is taken preliminary to the filling operation. The pump is then started and after priming has been effected the discharge is directed through line 31, 31a into the gas phase of the container 2. The valves 21 and 22 in the withdrawal lines remain closed throughout the filling operation. The liquid is forced in under elevated pressure from the pump and, accordingly, the entering liquid is subcooled appreciably below its boiling point at the pressure in container 2, and has a substantial refrigerating capacity which acts to cool the gas in the receiver and to condense a portion of it, which in turn serves to compensate for the progressive reduction in gas space and avoid the development of excessive pressure. It has been found that the refrigerating effect is in fact sufficient in normal practice to result in a reduction of pressure despite the marked decrease in gas space.

As the liquid level approaches the normal "filled" line 42—42 the trycock 43 is cracked open, and as soon as liquid begins to discharge therefrom the pump is caused to cease delivering, as e. g. by pressing a button to open the electric circuit to the pump drive motor in case an electric motor is employed for the purpose, or by opening the priming valve 35. The trycock 43 is then closed and a final pressure reading taken on gauge 44. This final pressure and the initial pressure readings are utilized in arriving at the amount of the net filling to be charged the consumer, as will be discussed more fully below.

In the quantitative measurement of highly volatile liquefied gases it is practically necessary to employ some definite standard. For oxygen, for example, it is common to refer to it in terms of an equivalent amount of oxygen gas at normal atomspheric pressure of 14.7 lbs. per square inch and room temperature of 70° F. Apart from variations in volume of gaseous oxygen, the specific volume of oxygen in the liquid state also varies quite appreciably under different equilibrium conditions. For example, the specific volume of liquid oxygen at 60 lbs. per square inch pressure gauge is approximately 10% greater than the specific volume at atmospheric pressure of 14.7 lbs. per square inch absolute, assuming equilibrium conditions in each case. This means, of course, that the net weight of liquid oxygen to the "filled" line in a container such as that shown at 2 in the drawings will vary correspondingly with the conditions, in addition to the variation in the respective weights of oxygen present initially as a gas before filling, and in the remaining gas space after filling.

Having measured or otherwise determined the volume of the container to the filled line, the theoretical net fill can of course be determined mathematically taking into account the initial and final pressures and assuming a saturated gas in each case. But in view of variable factors, such as the gases not in fact being under saturated conditions, except possibly in a rare case, the actual fill will not correspond exactly with the theoretical fill. It has been found, however, from a series of fillings in which the initial and final pressures were noted and recorded and the actual amount of the filling determined by weighing, that the departure from the theoretical fill, or, in other words, the actual amount of the fill or added charge for any filling, can be predicted quite closely by reference to the initial and final pressure obtaining in the particular charging operation. In fact a good approximation to the actual amount of charge can be based on either the initial pressure alone or the final pressure alone, particularly the latter. For most accurate results, however, it is preferable to take into consideration both the initial and final or shutdown pressure.

A rapid convenient method is to have prepared and use a chart tabulated in one direction for one of the pressures, e. g. a suitable range of initial pressures, and in the cross direction for a suitable range of final pressures.

The data for the table or chart may be obtained in various ways but one practical manner is to employ a standard container mounted on weighing scales with disconnectible or flexible conduit connections and run series of test fills. For example, the container is exhausted of liquid and then the pressure bled down if necessary to a certain value such as 100 lbs. per square inch, the container and contents are weighed, liquid oxygen is forced in under pressure until it reaches the predetermined standard level, the final pressure is noted, and the container and contents again weighed. Subtracting the initial weight from the final weight gives, of course, the net fill under the conditions of an initial pressure of 100 lbs. per square inch and the observed final pressure. The test is then repeated using the same initial pressure but controlling the manner of adding the liquid so as to arrive at a different final pressure without bleeding off any gas from the container. The desired final pressure may be obtained by varying the flow of added liquid between the inlet pipes 31a and 31b. If all the liquid is added through the branch 31b which leads to the bottom of the container there will be no substantial cooling and only a moderate condensation of the gas in the container and the final pressure will be high. Liquid added, however, through branch 31a will cool and condense some of the residual gas and accordingly keep down the pressure and a final pressure may be obtained which is lower than the initial pressure. By selectively varying the flow, therefore, between the two branches the final pressure desired may be obtained. After the above series of tests are run another similar series may be run but starting with a different initial pressure in each case.

From the data thus obtained, a master chart may be prepared such as that shown below.

*Net fill to full trycock cu. ft.*

| Initial Converter Press. P. s. i. Ga. | Shutdown Pressure, P. s. i. Ga. | | | | | |
|---|---|---|---|---|---|---|
| | 20 | 40 | 60 | 80 | 100 | 120 |
| 25 | * * | * * | * * | * * | * * | 43,100 |
| 50 | * * | * * | * * | * * | * * | * * |
| 75 | * * | * * | * * | * * | * * | * * |
| 100 | 47,150 | 45,800 | 44,500 | 43,700 | 42,800 | 42,150 |
| 125 | * * | * * | * * | * * | * * | * * |
| 150 | * * | * * | * * | * * | * * | * * |
| 175 | * * | * * | * * | * * | * * | * * |
| 200 | * * | * * | * * | * * | * * | * * |
| 225 | * * | * * | * * | * * | * * | * * |
| 250 | * * | * * | * * | * * | * * | 40,200 |

In the above chart the initial gauge pressures per square inch are noted in the vertical column at the left and the final pressures are arranged horizontally. For simplicity, only a few of the data are actually included, and it will be understood that in a table as used the asterisks would be replaced by appropriate figures indicating the charges for the corresponding initial and final pressures. As shown, the readings are for pressure steps of 25 lbs. for the initial pressure and 20 lbs. for the final pressure, but the chart can, of course, be made up to have steps which are smaller in amount.

The amount of oxygen added to the container in a charging operation, and to be billed a customer, if that is the purpose, will be determined, therefore, by noting the initial pressure, filling the container to the trycock line in the manner heretofore described, noting the final pressure immediately upon shutting down the pump, and by reference to the chart finding the amount of the oxygen added. For example, if the initial pressure reading were 100 lbs. and the final pressure 60 lbs. the net charge, as read from the table, in terms of gas at 70° F. and 14.7 lbs. pressure absolute, is 44,500 cu. ft. As has been pointed out, the figure obtained may not be precise but it will be reasonably close. Furthermore, in so far as the customer is concerned there will be a net error in the direction of overfill. This results particularly from the fact that there is a lag in time and some continuation of liquid flow between the first indication of liquid at the trycock and the cessation of the filling operation. In other words even if the trycock is closed immediately that liquid begins to run out the trycock there is some liquid in, for example, the supply line which will continue on into the tank and the closing of the trycock retains an appreciable amount of liquid above the level which would obtain if the trycock were left open to slowly drain down to the exact level.

Since certain changes may be made in carrying out the above method without departing from the scope of the invention, it is intended that all matter contained in the above description shall be interpreted as illustrative and not in a limiting sense.

Having described my invention, what I claim as new and desire to secure by Letters Patent, is:

1. A method of recharging a closed pressure container for highly volatile liquefied gas material which has been exhausted substantially of its liquid contents but retains an amount of gas under pressure and of determining to a relatively close approximation the amount of the charge without measurement of the temperature of the contents said method comprising, measuring the initial gas pressure within the container, filling the container by forcing the liquefied gas thereinto while maintaining the container closed and under pressure and continuing the filling to a predetermined liquid level, measuring the final container pressure at the completion of the filling operation, and referring said initial and final pressures to a previously prepared master chart showing the amounts of charges in terms of a common standard of measurement corresponding to various initial and final pressures and thereby determining the amount of the particular charge for which the particular pressure readings were taken.

2. A method of determining the amount of the charge when recharging a closed pressure container for highly volatile liquefied gas material which has been exhausted substantially of its liquid contents but retains an amount of gas under pressure comprising, measuring the initial gas pressure within the container, filling the container by passing the liquefied gas thereinto through the gaseous contents while maintaining the container closed and under pressure the entering liquid being at a temperature below that of said gaseous contents and effective to restrict substantially the pressure and continuing the filling to a predetermined liquid level, measuring the final container pressure at the completion of the filling operation, and referring said initial and final pressures to a previously prepared master chart showing the amounts of charges in terms of a common standard of measurement corresponding to various initial and final pressures respectively and thereby determining the amount of the particular charge for which the particular pressure readings were taken.

3. A method of recharging a closed pressure container with a liquefied gas having a boiling point at atmospheric pressure below 273° K. said container having been exhausted substantially of its liquid contents but retaining an amount of gas under pressure and of determining to a relatively close approximation the amount of the charge added without measurement of the temperature of the contents said method comprising, measuring the initial gas pressure within the container, filling the container by forcing the liquefied gas thereinto while maintaining the container closed and under pressure and continuing the filling to a standard liquid level determined by a trycock, measuring the final container pressure at the completion of the filling operation, and referring said initial and final pressures to a previously prepared master chart showing the amounts of charges in terms of a common standard of measurement corresponding to various initial and final pressures and thereby determining the amount of the particular charge for which the particular pressure readings were taken.

RUSSELL M. THAYER.

REFERENCES CITED

The following references are of record in the file of this patent:

UNITED STATES PATENTS

| Number | Name | Date |
|---|---|---|
| 1,659,384 | Thomas | Feb. 14, 1928 |
| 1,950,353 | Dana | Mar. 6, 1934 |
| 2,292,375 | Hansen | Aug. 11, 1942 |
| 2,321,445 | Yendall et al. | June 8, 1943 |
| 2,326,187 | White | Aug. 10, 1943 |
| 2,326,511 | Zenner | Aug. 10, 1943 |